(12) United States Patent
Ethridge

(10) Patent No.: US 9,581,021 B2
(45) Date of Patent: Feb. 28, 2017

(54) SYSTEM FOR EXTRACTION OF VOLATILES FROM PLANETARY BODIES USING MICROWAVE AND RF PROCESSES

(71) Applicant: Edwin Ethridge, Huntsville, AL (US)

(72) Inventor: Edwin Ethridge, Huntsville, AL (US)

(*) Notice: Subject to any disclaimer, the term of this patent is extended or adjusted under 35 U.S.C. 154(b) by 199 days.

(21) Appl. No.: 14/744,003

(22) Filed: Jun. 18, 2015

(65) Prior Publication Data

US 2016/0024921 A1 Jan. 28, 2016

Related U.S. Application Data

(60) Provisional application No. 62/027,313, filed on Jul. 22, 2014.

(51) Int. Cl.
| | | |
|---|---|---|
| *E21C 51/00* | (2006.01) | |
| *B23B 51/08* | (2006.01) | |
| *H05B 6/80* | (2006.01) | |
| *H05B 6/70* | (2006.01) | |
| *H05B 6/72* | (2006.01) | |

(52) U.S. Cl.
CPC ............. *E21C 51/00* (2013.01); *B23B 51/08* (2013.01); *H05B 6/702* (2013.01); *H05B 6/707* (2013.01); *H05B 6/72* (2013.01); *H05B 6/80* (2013.01); *B23B 2226/75* (2013.01); *B23B 2251/68* (2013.01)

(58) Field of Classification Search
CPC ...................................................... E21C 51/00
See application file for complete search history.

(56) References Cited

U.S. PATENT DOCUMENTS

| | | | |
|---|---|---|---|
| 4,571,473 A | 2/1986 | Wyslouzil et al. | 219/691 |
| 5,076,727 A | 12/1991 | Johnson et al. | 405/129.35 |
| 5,205,364 A | 4/1993 | Juergens et al. | 175/38 |
| 5,318,116 A | 6/1994 | Vinegar et al. | 166/60 |
| 5,509,956 A | 4/1996 | Opperman et al. | |
| 5,536,378 A * | 7/1996 | Gibson | C21B 3/04 204/234 |

(Continued)

FOREIGN PATENT DOCUMENTS

WO   WO 2009/151822 A1   12/2009

OTHER PUBLICATIONS

PCT/US2015/040661 Oct. 23, 2015 International search report and written opinion of the international searching Authority Oct. 23, 2015; ISA/US.

(Continued)

*Primary Examiner* — John Kreck
(74) *Attorney, Agent, or Firm* — James Richards

(57) ABSTRACT

A system for extraction of volatiles from bodies in a vacuum. The volatile containing solid may be subsurface heated with microwave or RF energy subliming volatiles that are captured with a containment structure that directs the flow of the volatile through a cold trap for collecting and condensing the volatile. In one variation, a sample, or an entire body may be enveloped in a sealed container for extraction of volatiles that are then collected and condensed. In a further variation, a planetary surface area is covered and the perimeter sealed at the surface. The area is then heated from above to release volatiles that are then collected and condensed. To heat layers below the surface that contain high concentrations of volatiles, a hollow auger can gain access to the subsurface volatile and microwave or RF energy can be delivered down the hollow auger with a coax cable and vapor can escape through the hollow auger to a capture apparatus.

29 Claims, 12 Drawing Sheets

(56) References Cited

U.S. PATENT DOCUMENTS

| | | | |
|---|---|---|---|
| 6,086,830 A | 7/2000 | Kartchner | |
| 6,437,304 B2 | 8/2002 | Ushijima et al. | |
| 6,603,422 B2 | 8/2003 | Wright | |
| 7,325,511 B2 | 2/2008 | Goto et al. | |
| 7,935,176 B2 * | 5/2011 | Burton | B01D 53/002 202/158 |
| 8,357,884 B1 | 1/2013 | Ethridge | 219/679 |
| 2008/0003133 A1 | 1/2008 | Taylor | |
| 2011/0077800 A1 | 3/2011 | Palmer et al. | 701/2 |
| 2011/0168164 A1 * | 7/2011 | Zillmer | B64G 1/16 126/600 |
| 2012/0155966 A1 * | 6/2012 | Zillmer | B64G 4/00 405/128.85 |
| 2014/0155881 A1 | 6/2014 | Prakash et al. | |

OTHER PUBLICATIONS

Applicant, Response filed with demand in PCT/US2015/040661, May 23, 2016.

Ethridge, Edwin, Kaukler, William, "Finite Element Analysis of Three Methods for Microwave Heating of Planetary Surfaces", Presentation for 50th Aerospace Sciences Meeting Jan. 9-12, 2012.

Ethridge, Edwin, Kaukler, William, "Finite Element Analysis of Three Methods for Microwave Heating of Planetary Surfaces" Technical paper,AIAA, 50th AIAA Aerospace Sciences Meeting Including the New Horizons Forum and Aerospace Exposition. Jan. 9-12, 2012.

Ethridge, Edwin, Kaukler, William, "Microwave Extraction of Volatiles for Mars Science and ISRU" Presentation for: Concepts and Approaches for Mars Exploration, Houston, TX, Jun. 12, 2012.

* cited by examiner

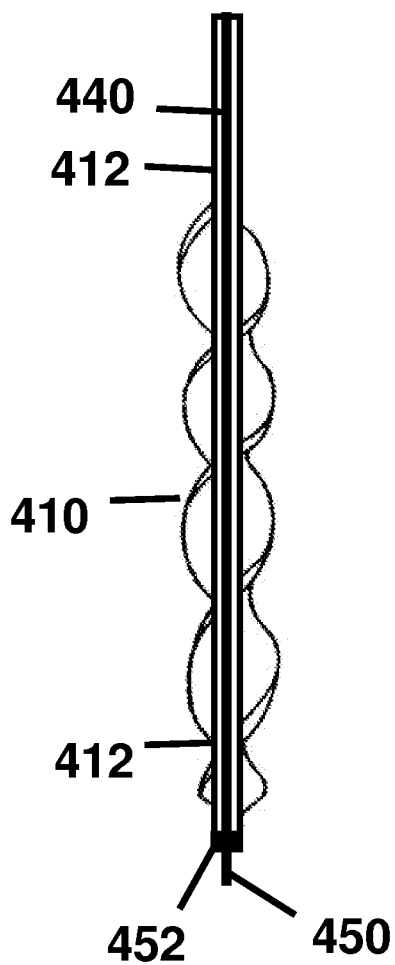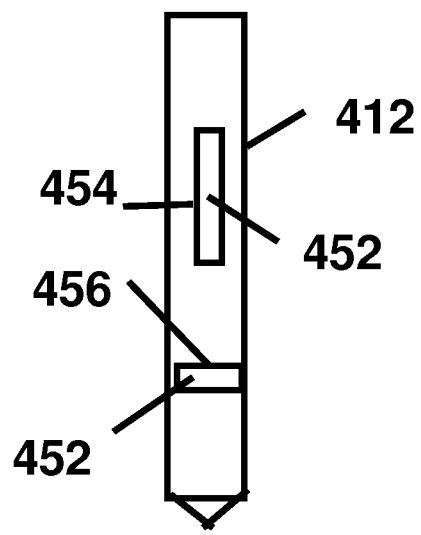
Fig. 4b
Fig. 4c

SYSTEM FOR EXTRACTION OF VOLATILES FROM PLANETARY BODIES USING MICROWAVE AND RF PROCESSES

RELATED APPLICATIONS

This application claims the benefit under 35 USC 119(e) of U.S. provisional application 62/027,313 titled "System for Extraction of Volatiles from Planetary Bodies Using Microwave Processes" filed Jul. 22, 2014 by Ethridge, which is incorporated herein by reference in its entirety.

This application may have related disclosure to that of U.S. Pat. No. 8,357,884 titled: "System of extraction of volatiles from soil using microwave processes", issued Jan. 22, 2013 to Ethridge et al., and U.S. Pat. No. 8,357,884 is incorporated herein by reference in its entirety.

TECHNICAL FIELD

The present invention pertains generally to the field of space exploration, more particularly to the extraction of resources from planetary bodies including moons, asteroids, comets and other associated bodies, the resources being typically substances which can become volatile.

BACKGROUND

Mining of planetary bodies may be possible and beneficial to mankind. Mining of planetary bodies is the process of extracting raw materials from the planetary bodies while in space. In this regard, planetary bodies, such as, for example, asteroids and/or minor planets are often rich in raw materials. For example, planetary bodies may comprise one of or combinations of regolith, rocks, water, methane, carbon dioxide, and other volatiles, as well as many other types of resources.

Mining of planetary bodies may be beneficial for a number of reasons. For example, the mined resources may be used for space construction, sustainment of astronauts on site, radiation protection shielding, and rocket propellant. This reduces the mass of resources that must be launched from Earth. Using resources gathered during space exploration is oftentimes referred to as in-situ resource utilization.

BRIEF DESCRIPTION

Briefly, the present disclosure relates generally to a system for extraction of volatiles from a body by providing subsurface heating of body containing the volatile and collecting and condensing the volatile gas before it escapes. The volatile in a chilled body contained in a reduced pressure may be heated with microwave or RF energy and captured with a containment structure that directs the flow of the volatile through a cold trap for condensing the volatile. In one variation, a sample, or the entire body containing volatiles may be enveloped in a sealed container for extraction of volatiles that are then collected and condensed. In a further variation, a planetary surface area is covered and the perimeter sealed at the surface. The area is then heated to release volatiles that are then collected and condensed. In a further variation, subsurface heating of a volatile rich layer is selectively heated with a hollow auger apparatus with means to deliver the microwave or RF energy down the hollow auger and volatiles extraction through the hollow auger. In a further variation a body containing volatiles is placed into a sealed container for extraction of volatiles, cooled to freeze the volatiles, and a vacuum applied prior to a heating with microwave or RF energy for extraction and collection of the volatiles.

In a further variation the body can be heated to temperatures sufficiently high to decompose volatiles contained in mineral compounds after the condensed volatiles have escaped.

In various embodiments, the system may comprise:

an electromagnetic energy source for producing electromagnetic energy;

an antenna coupled to the electromagnetic energy source for receiving the electromagnetic energy;

the antenna may be configured for disposition external to the surface (above the surface) of the planetary body;

the antenna may be configured for directing the electromagnetic energy toward the planetary body for heating at least a portion of the planetary body to convert the volatile substance to vapor, the antenna may be at the end of a hollow auger apparatus to heat subsurface layers in the planetary body.

The system may further comprise a containment member; the containment member may be a box or a bag or a cargo bay of a spacecraft. Alternatively, the containment member may be a structure or membrane sealed around a perimeter of the structure for containing volatile vapors.

The containment member may be disposed external to the surface of the planetary body for containing the vapor released by the planetary body through the surface of the planetary body. The containment member may form a seal sufficient to maintain a positive pressure of the vapor within the containment member, i.e., greater pressure within the containment member than outside the containment member.

The system may further comprise a condensation unit coupled to the containment member and configured for receiving the vapor from the containment member. The condensation unit is coupled to a vacuum source to maintain the lower pressure within the condensation unit. The condensation unit may be configured for condensing the vapor for concentration and storage of the volatile substance.

In one variation, the containment member may be configured to enclose the entirety of the planetary body and the seal connects two portions of the containment member.

In a further variation, the containment member may cover a portion of the surface of the planetary body and the seal is formed between the containment member and the surface of the planetary body.

In another variation, the containment member may be a hollow auger penetrating into the planetary body. In various variations, the seal from the containment member to the planetary body may be formed using a sealing device. One exemplary sealing device may comprise a flange surrounding an aperture. The flange may extend laterally a specified distance. The distance may depend on the regolith properties including porosity, regolith gas permeability, temperature profile, and depth of volatiles. Typically the flange should be pressed into the regolith, and may extend preferably one half of the depth of the volatiles, more preferably at least equal to the depth of the volatiles. More preferably twice the depth of the volatiles. The sealing device may also include flexible members to act as gaskets for better conformal contact sealing against rough surfaces.

In a further variation, the antenna may be a directional antenna. Any directional antenna may be used including arrays, Yagi's, Vivaldi, parabolic reflectors, horn antennas, slotted antennas, or other directional antennas.

In one variation, the antenna comprises a horn antenna having a feed region at a first end and an exit aperture at a second end, the sealing device forming a flange around the exit aperture at the second end; the flange for contacting the surface of the planetary body to form the seal for maintaining the positive pressure.

The antenna may be pressed into the regolith for improving the seal. The system may include a robotic arm configured for positioning the antenna and pressing the flange onto the surface of the planetary body to form the seal.

In a further variation, the containment member may surround the planetary body without contacting the planetary body thereby allowing the planetary body to float free of the containment member.

Alternatively, the system may include a holding system for attaching and holding a relative position of the planetary body and the system.

In a further variation, the containment member may comprises plastic film.

Various film materials may be used including vinyl, polyethylene, polycarbonate, polyester, BoPET (biaxially-oriented polyethelyene terephthlate, polyimide, poly-oxydi-phenylene-pyromellitimide, or other typically flexible film materials. Mylar® and Kapton® are exemplary brand products.

In a further variation, the plastic film may be metalized for reflecting and containing the electromagnetic energy.

In a further variation, the containment member comprises a substantially spherical portion. Cylindrical and spherical shapes help to minimize stress concentrations and thus maximize the performance of a given material.

In various embodiments, the operational positive pressure may be below 1000 Pascals. For water vapor near freezing, the pressure may be near or slightly above the water triple point at 611 Pascals. For ice sublimation, the pressures may be below 600 Pascals to 10 Pascals or even 1 Pascal or below. In various embodiments, the electromagnetic energy may be between 1 MHz and 100 GHz. The frequency selection may be driven by specific absorption and depth of penetration of the electromagnetic energy in the regolith. Alternatively, the selection may be driven by absorption of a particular volatile. Water ice is typically not absorbed readily at microwave frequencies, so the selection of a frequency absorbed by the regolith becomes desirable. In a further embodiment, the selection of frequency may be made based on availability. For example, the spacecraft may have a communications system or radar system that already has RF or microwave equipment that may be used for both extraction and communications.

In a further variation, the electromagnetic energy may be sufficient for elevating a temperature of the planetary body to promote sublimation of the volatile substance in reduced pressure. It may not be necessary to elevate the temperature to liquid boiling temperature to be effective. Low temperatures may be sufficient.

In a further variation, the electromagnetic energy may be sufficient for elevating a temperature of the planetary body to promote decomposition of chemically bound volatiles in the planetary body.

BRIEF DESCRIPTION OF THE DRAWINGS

The present disclosure is described with reference to the accompanying drawings. The systems and method described can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 3b depicts an exemplary deployment of the collection system of FIG. 3a.

FIG. 4b depicts greater detail of the auger of FIG. 4a.

FIG. 4c depicts an expanded side view of the microwave ports in the hollow auger shank.

DETAILED DESCRIPTION

Glossary

Figure 1A:
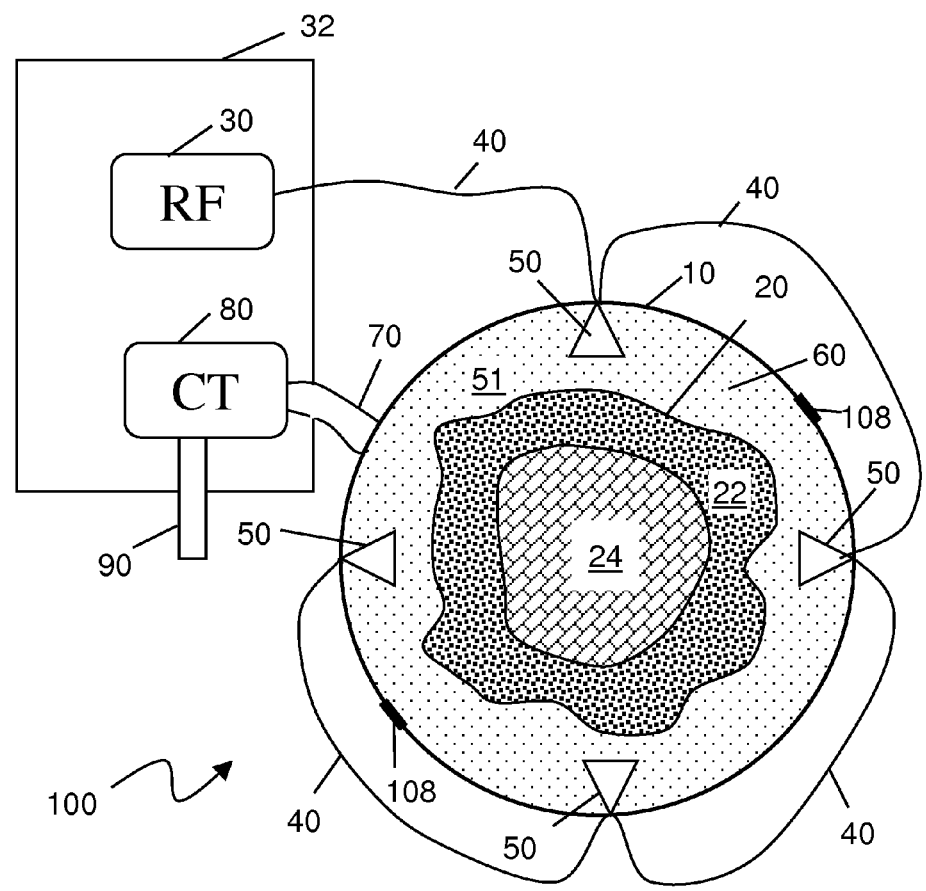
FIG. 1a illustrates a side view of an exemplary embodiment of volatile extraction and collection system for extraction of volatiles from a small planetary body using microwaves.

The following terms may be referred to throughout the disclosure and are provided herein as a basis for description. The terms and respective meanings are not intended to be limiting and may be more broadly construed in other embodiments of the present disclosure.

The term "above the surface" of a planetary body generally means the side of the surface that is away from the center of mass of the planetary body.

The term "auger" refers to an apparatus typically comprising a shank having spiral flutes. The spiral flutes may be formed by attaching a helical blade to a central shank. Augers may be used to anchor bodies to a surface. The central shank may be hollow and may be used herein for delivery of electromagnetic energy and extraction of volatiles.

The term "auger drill" refers to a drill typically comprising a shank having spiral flutes. The spiral flutes may be formed by attaching a helical blade to a central shank.

The term "space body" or "in-space body" refers to a natural celestial object of any size including but not limited to asteroids, small asteroids, rocks, comets, moons, planets and other objects.

The term "coaxial cable" may refer to any cable consisting of at least a conductive outer metal tube that encloses and is insulated from a central conducting core, and which may be used for transmitting high-frequency signals including RF and microwave energy.

The term "cold trap" and "condensation unit" may refer to any device that condenses vapors removed from a planetary body by boiling or sublimation. The result of condensation may be liquid or solid.

The term "containment member" or "containment structure" refers to a structural element for containing vapors released from the planetary body. For example, a wall of a box, tank, bag, or balloon. The wall may be rigid or flexible. The containment structure typically allows the desired vapors to propagate to a condensation unit for condensing the vapors.

The term "collection chamber" typically refers to a space within the containment structure for holding collected vapors. The term may also include the containment structure, depending on context.

The term "core drill" refers to a drill designed to produce a cylindrical hole in soil or rock and remove the contents to the surface.

The term "dielectric" may refer to any substance that is a poor conductor of electricity (particularly a substance with electrical specific conductivity of less than a millionth ($10^{-6}$) of a Siemens per centimeter), but an efficient supporter of electrostatic field.

The term "hermetic seal" refers to a gas tight seal that prevents excessive loss of the desired gas or gasses, preferably near zero loss.

The term "horn antenna" generally refers to a type of antenna having a feed region on one end and forming an expanding flaring tubular shape to an exit region at the other end. Cross sections may include circular, square, rectangular or other shapes.

The term "multi-function" may refer to a single structural component which serves two or more of the following functions: a boring component, microwave delivery component, volatile transport or any other function of a component of a device for extraction of volatiles from soil using microwave processes.

The term "microwave" may typically refer to electromagnetic energy having a wavelength from 1 millimeter to 1 meter (300 GHz to 300 MHz) The term "microwave" in this disclosure, however, may also include much lower frequencies, for example, down to 1 MHz or lower—as low as may be useful for radiative or inductive heating of volatile containing material.

The term "microwave delivery component" may refer to any device in communication with a microwave source and capable of conveying microwave energy from the microwave source and selectively delivering the microwave energy to a targeted area. Similarly for "electromagnetic energy delivery component" For example: antennas, waveguide, and coax cable.

The term "microwave source" or "microwave generator" may refer to any device capable of selectively producing microwave energy.

The term "mobility component" may refer to any component capable of transporting an apparatus on either terrestrial or extra-terrestrial soil.

The term "planetary body" refers generally to any natural object in space including planets, small planets, moons, asteroids, comets, rings or other orbiting objects having mineral content.

The term "radio frequency" also referred to as "RF" typically refers to electromagnetic energy with a wavelength from 1 meter to 100,000 meters. In this disclosure, the term may extend into the microwave region, depending on context.

The term "regolith" may refer to a layer of loose heterogeneous superficial material covering a planetary body or frozen layer. Typically the regolith includes rock particles and dust that covers the solid crust or core of a planetary body (e.g., moon, planet, asteroid, or comet).

The term "remote control component" may refer to any component capable of controlling the position of a device or apparatus in either a terrestrial or an extra-terrestrial location from a distance.

The term "remote microwave source" may refer to any microwave source that is not integral with a microwave delivery component and may be located and in operable communication with microwave delivery component at a distance from microwave delivery component.

The term "volatile" may mean readily evaporating or vaporizable at a relatively low temperature as well as gases trapped in the condensed volatile that is released when the condensed volatile sublimes.

The term "water" generally means the chemical H2O as solid, liquid, or vapor, and may refer specifically to the liquid phase, depending on context.

The term "waveguide" or "coax cable" may refer to any means to convey microwave or RF energy from the source to the antenna.

Extraction of Volatiles from Planetary Bodies

Unmanned asteroid prospecting missions will prospect for water and other useful resources on the asteroids. The delta velocity to change trajectories to go to different asteroids will consume propellant. The limited propellant will reduce the number of trajectory changes and the number of asteroids to be visited. Limited Earth launch mass will also limit the quantity of propellant to take on a mission. Water can be used as the propellant for asteroid prospecting and mining missions. In-situ water from asteroids can be extracted to refuel the spacecraft extending the use of the spacecraft for continued prospecting and mining missions. Also, by using water extracted from an asteroid for the return propellant, a mission could be conducted with much lower Earth launch mass, since the largest component of a spacecraft mission is propellant.

The most efficient chemical rocket propellant in space is hydrogen and oxygen. These are the constituents that form water and can be produced by water electrolysis. Advanced rocket propellant systems include nuclear thermal propulsion that may be considered for a human mission to Mars. Hydrogen is heated by the nuclear process and hydrogen is ejected from the engine at high velocity. At Mars, rocket propellant may be fabricated from in-situ resources to ascent from the Mars surface back to orbit. Water in the soil and carbon dioxide from the atmosphere can be combined in chemical reactions with the Sabatier process to produce methane and oxygen, another efficient rocket propellant. On the moon, hydrogen peroxide rocket propellant may be under consideration for hopping spacecraft to move from one location to another and for the ascent from the lunar surface back to lunar orbit. The water compound can be used as the ejection mass for solar (or nuclear) electric ion plasma propulsion. An energy source such as microwaves can ionize hydrogen or the water molecule that is rapidly ejected from the rocket engine. Hydrogen has a higher specific impulse, but, water is much easier to store and involves a more simple process.

In general, planetary bodies in space are in a vacuum and often at very low temperatures. Heating of the bodies can liberate and extract the condensed volatiles by sublimation.

Extraction and recovery of volatiles from bodies in space can be performed because of the reduced pressure or vacuum of the surroundings and the cold temperatures. Volatiles are condensed in the solid body and are stable in the condensed state according to the temperature and pressure relationship illustrated by the phase diagram of a particular volatile. Other gases can be trapped in the condensed volatiles within the solid body. Other volatiles can be trapped in the solid body as compounds containing the volatile such as hydrates, carbonates, etc. Volatiles in general are stable at lower temperatures and can be liberated by heating the matter containing the volatiles. At low pressures the phase stability diagram illustrates that volatiles can be converted directly from the solid phase to the vapor phase of the volatile by heating the body containing the volatile.

By heating the condensed volatile or compound containing volatile species at reduced pressure, the volatile will be converted to its gas phase and the gas phase can pass out of the parent body, In the vacuum of space heat transfer into the body can be very low making it difficult to heat the body. This is due in part by the low environmental pressure or vacuum surrounding and within the body which reduces the heat flow by convection. Often the bodies are also porous with limited contacts between particles making up the regolith or soil which limits the heat flow by conduction through the matter. The low temperatures in space also reduce the heat transfer by thermal radiation. As a result the overall thermal heat transfer into the matter can be very low making it very difficult to heat the depth of the body by application of heat to the surface. But, microwave or RF energy will penetrate matter and the energy is absorbed according to the materials absorption properties. The absorbed energy is converted to heat within the body.

These conditions potentially generate an opportunity to extract potentially volatile substances that may hide in subsurface layers that remain at very low temperatures even though the surface temperature may be relatively hot during the day. Other volatiles mining opportunities may exist at specific geographic locations, for example at the north and south polar regions of the moon in lunar craters that are permanently shaded. Some of these craters have been at 100° K for billions of years even though the rim of the crater may receive sunlight. The asteroid belt between Mars and Jupiter has numerous asteroids of many sizes, most typically near −70° C., heated by weak sunlight. Some are known to contain water ice. Mars itself is known to have water ice, dry ice (solid $CO_2$) and methane and is thought to have had oceans of water in the past. It may have considerable subsurface water today, potentially to be extracted. Mars temperatures may be from a high of 20° C. at noon at the equator to −150° C. at the poles. Vast regions would seem to potentially have subsurface ice.

Planetary bodies can be heated within using RF energy that will penetrate into the depth of the body. RF energy will penetrate matter based on the properties of the matter. Based on the particular dielectric properties of the matter and the frequency of the RF energy, the RF energy will penetrate into the matter to lesser or greater extent being absorbed by the matter. As the energy is absorbed, the matter increases in temperature. This increase in temperature within the body may cause the liberation of the volatiles within the body by chemical processes such as sublimation of the volatile species or decomposition of the compound containing a volatile species.

Different frequencies of RF energy will penetrate to different depths. In general lower frequencies penetrate to greater depths while higher frequencies are absorbed greater and the penetration depth is shallow. This effect of frequency can be used to advantage. To heat to larger depths in larger bodies, lower frequencies can be used. While using shorter wavelengths, it is possible to concentrate the RF energy to a much smaller depth, heating to much higher temperatures to decompose volatile containing compounds. Volatiles obtained from planetary bodies are of tremendous value in space since they do not have to be launched from Earth and transported to the destination in space at great expense. This is due to the fact that to transport a given mass of material out of the gravitational well of the Earth requires a large mass of rocket and propellant to get a small quantity of mass to the destination. Acquiring resources or recycling resources in space reduces the quantity of mass required to resupply operations.

Volatiles can also be obtained from bodies as a result of space operations. This includes matter left over from various space operations and processes as well as the waste products of human activities and biological processes. The matter containing volatiles, compounds containing volatiles, or liquid water the volatiles can be converted to the solid state of the volatile by cooling to the solid state. By containing the matter in a container, the pressure can be reduced below the thermodynamic sublimation temperature. To cause the release of the volatile such as water by sublimation, RF energy can be used to heat the body within. The water can then be recovered by condensation in a cold trap in the vacuum line between the container and the vacuum source.

Often, volatiles in a planetary body are depleted from the surface due to local heating from the sun. For this reason it is advantageous to not waste energy heating the depleted surface and to get the RF energy deep into the planetary body. This can be accomplished by deploying the microwave extraction apparatus into the planetary body using an auger with a hollow shank. This could be an auger or twist drill or other means of penetration of the body by rotating or driving the apparatus into the body. The RF energy can be delivered down the hollow shank of the apparatus such as with a coax cable. The same hollow shank in the auger can also serve as the lowest resistance path for volatiles to flow from the regolith below. Thus, the auger can drive the RF/microwave energy delivery component into the regolith without having to first drill a hole. The regolith is pushed aside rather than being removed through the top of the hole.

The condensation of water vapor to ice at the cold trap is an exothermic process which will result in heat flow to the cold trap, this will tend to warm the cold trap and thermal conduction and rejection of this heat is required to keep the cold trap at a temperature below the condensation of water or other volatiles. In space, the reduction of mass is of utmost importance and efficient thermal conduction is needed. Heat pipes are very efficient for the transfer of heat, especially for cooling. Thermoelectric devices are also commonly used to cool components to cryogenic temperatures. But, thermoelectric devices are not electrically efficient. The heat ultimately has to be rejected from the spacecraft. Normally a spacecraft has thermal radiators aimed at deep space with a very low effective radiative temperature. The heat could be transferred to thermal radiators with heat pipes and/or with other high thermal conductivity materials such as those containing carbon nano-tubes.

Volatiles can also be trapped in mineral compounds such as hydrates and carbonates. After the condensed volatiles have been removed, the body can be further heated to higher temperatures to decompose and extract the chemically bound volatiles. As the body continues to absorb more of the microwave energy, the body gets hotter and hotter such that the compounds will decompose and volatiles will be released. As these volatiles, such as water and carbon dioxide, are released they can be captured by the same process with the cold trap.

FIG. 1a illustrates a side view of an exemplary embodiment of volatile extraction and collection system 100 for extraction of volatiles from a planetary body 20 using microwaves. In one embodiment, the volatiles are extracted from the regolith of the planetary body 20.

FIG. 1a shows the system adapted for extraction from a small asteroid. The entire asteroid is surrounded by a containment film or bag and all or part of the asteroid is heated with microwave or RF energy to release volatile gasses that are then condensed in a cold trap. FIG. 1a shows multiple fixed antennas; however, one or more may be used. The antennas may be fixed or movable. The antennas are shown inside the containment film. Alternatively, the antennas may be outside the film and may beam the energy through the film to the asteroid (not shown).

Referring to FIG. 1a, volatile extraction and collection device 100 comprises a microwave source 30, a microwave delivery component 40, a containment structure 10, and one or more microwave antennas 50. The containment structure 10 is placed surrounding a planetary body 20 (e.g. small asteroid). The planetary body 20 may comprise a regolith layer 22 and a core 24. The microwave/RF source 30 and cold trap 80 are shown housed in a spacecraft 32. The spacecraft 32 may include structures (not shown) to deploy, position and hold the antennas and the containment structure. Further, the spacecraft may optionally anchor or attach to the planetary body to synchronize orbit and spin, or may maintain free floating separation, using controls to maintain relative position (Not shown).

During operation, the planetary body 20 is heated with microwave energy from microwave energy originating at the microwave source 30 thereby generating gases 51. The gases 51 migrate from the containment structure 10 to the cold trap 80, which is described further herein.

The containment structure 10 is adapted to encase the planetary body 20. In this regard, the containment structure 10 may comprise an opening that can be closed around the planetary body 20. Upon closing, the containment structure 10 comprises a sealing component 108 that ensures that gases 51 do not escape the collection chamber. Sealing structures may comprise clamps, tapes, adhesive, zip bag structures or other sealing structures. The containment structure is made of a material that is gas impermeable and may be electrically conducting and microwave reflecting. For example, the containment structure 10 may be aluminized Mylar® (polyester), Kapton®, or other plastic film to reflect the microwave energy back into the bag. The containment structure may be any structure that provides containment of the planetary body including a rigid box or metallic box or other structure. Further note that the containment structure may be repaired to seal holes in the containment structure.

In the exemplary embodiment shown, microwave delivery component 40 is operatively coupled to microwave source 30 and is adapted to convey microwave energy from the microwave source 30 to the microwave antenna 50 or multiple antennas. One or more antennas may be excited separately or together or in turn. In some cases, it may be more desirable to heat one area with concentrated power of one antenna. In other cases, it may be desired to heat the entire object or covered area using all antennas. Exemplary microwave delivery component 40 may be a coax cable or a microwave waveguide; however, other types of microwave delivery components are possible in other embodiments. The microwave antenna 50 is adapted to direct the microwave energy received via the microwave delivery component 40 into the regolith 22 of the planetary body 20. Note that the dimensions of the microwave delivery component 40 correspond to the wavelength and power of the microwaves emitted by microwave source 30. Further note the microwave delivery component 40 may be coax cable. Further note that the microwave antenna may be inserted into the bag, and such insertion is sealed to ensure that gases do not escape the containment structure 10. As the microwave energy is delivered to the planetary body 20, the volatile vapor pressure in the pores of the planetary body 20 increases. As the pressure increases, volatiles 51 flow from the higher pressure within the regolith to the lower pressure within the collection chamber 60 and collect in the containment structure 10. As an example the volatiles 51 can be water vapor.

As the water vapor 51 collects in the containment structure 10, it passes out of the containment structure 10 through a hollow conduit 70 and is collected by a cold trap 80. Note that a hollow conduit 70 allows the water vapor to pass to the cold trap 80; however other types of structures, for example a tube, may be used to allow the water vapor to pass to the cold trap 80 in other embodiments. Note that the apparatus 70 allows the gases 51 to migrate from the containment structure 10 to the cold trap 80. Thus, the interface of the apparatus 70 with the containment structure 10 is sealed to ensure that gases 51 do not escape the containment structure 10 and do not escape the cold trap 80. The cold trap 80 has a means for opening 90 to vacuum to facilitate maintaining a low pressure in the cold trap and for the disposal of unwanted volatiles.

In a further alternative, the cold trap may be located inside the containment structure for maximum exposure to the atmosphere in the bag.

The cold trap would typically include structures for storing the collected water ice. For example, a valve may close to isolate the cold trap from the vacuum of space. A valve may close to isolate the cold trap from the collection bag and a heater may then operate to sublime the ice and allow the water vapor to flow to a storage container. The cold trap may then be cooled and valve opened to the collection chamber and to the space vacuum for further collecting of water vapor from the collection chamber 60.

Note that such process minimizes the escape of vapor from the system 100 as the vapor is collected. Vapor can be extracted by sublimation and collected by condensation from the planetary body without thawing (melting) the soil of the planetary body 20, allowing mass flow by vapor transport from the planetary body 20 to be extracted and collected at low pressure (vacuum) and at temperatures suitable for sublimation of the volatile. For example, in an exemplary embodiment, water vapor can be extracted and collected at soil temperatures below 0 degree C., where water vapor pressure is about 612 Pascals. Sublimation may still be used, though at a lower production rate, at a temperature of −60 C, where the water vapor pressure is about 1 Pascal. A further advantage of using very low vapor pressures is that a very light, thin membrane may be used for the collection membrane 10. For example, a 100 meter diameter sphere could possibly contain a 100 Pascal pressure using 1 mil (0.025 mm) Mylar® polyester film.

In the exemplary embodiment shown, microwave delivery component 40 supplies energy to the microwave antenna 50, as described hereinabove. The microwave antenna 50 may be a directional antenna or an omnidirectional antenna, for example, a horn emitting device or helical antenna. Note that other types of microwave antennas are possible in other embodiments. Note that in the embodiment shown, microwaves radiate from the antenna 50 with sufficient gain for direction of the energy into the planetary body 20. Note that the optional microwave reflecting metallic coating on the containment structure may reflect microwaves back toward the planetary body for greater energy delivery efficiency.

In the exemplary embodiment, the cold trap 80 recovers the extracted volatile vapor. In one embodiment, the gases 51 that are delivered to the cold trap 80 collect on a chilled surface of the cold trap 80 as it percolates from the planetary body 20 and migrates through apparatus 70.

In another exemplary embodiment, the cold trap 80 may comprise a series of cold traps at different temperatures to selectively condense different gasses.

In the exemplary embodiment depicted in FIG. 1a, the microwave or RF energy generated by microwave source 30 may have a wavelength ranging from 0.05 to 100 GHz. Microwaves with a wavelength of 0.05 GHz typically penetrate much deeper into the regolith but heat much slower than higher frequencies such as 100 GHz microwaves, which may be used for shallower penetration, but heating to very high temperatures in short times.

The structural configuration of the system 100 illustrated in FIG. 1a contemplates multiple synergistic processes, structural integration, and multi-functioning of numerous integrated components, which makes this approach highly efficient. The time, energy, and equipment for excavation and transport of the regolith are not required, and potential damage from raised dust is greatly minimized. Microwave energy delivered by microwave antenna 50 can penetrate many feet into the planetary body 20 past the thin, waterless surface layer (not shown). Surface absorption reduces efficient water extraction by heating material that likely contains little water and prevents energy from reaching the furthest depths.

The volatile extraction and collection system 100 may also be used to extract other valuable volatiles from the planetary body 20, such as solar wind products trapped within the lunar polar water ice. The cold trap 80 may include a series of cold traps at different temperatures to separate different volatiles with different condensation temperatures.

The volatile extraction and collection system 100 may also be used to further heat the volatiles containing body to higher temperatures to decompose volatiles containing compounds from the planetary body 20. The cold trap 80 can be used to collect these volatiles also.

As condensed volatiles are removed from the planetary bodies such as asteroids, the regolith particulate mater may become lose and begin to physically disintegrate into free grains, particles, and dust. The containment structure 10 may also contain the particulate asteroidal material for storage or for subsequent transportation to another destination. For example, the containment structure 10 may be left behind after the volatiles extraction mission to permanently or temporarily contain the body and free particles.

In various embodiments of the volatile extraction and collection system 100, a user may direct the microwave energy of a microwave beam into the planetary body 20. In this regard, heating occurs by dielectric absorption into regolith particles, and trapped water may be released depending on the dielectric properties, temperature, and microwave wavelength. The heating may occur by the microwave coupling to the planetary body material which heats the ice by conduction, causing the water ice to sublime directly to water vapor.

In one variation of the present disclosure, the gas pressure between the grains of regolith is much higher than at the surface. The structural design of volatile extraction and collection system 100 may be adapted to take into account that the magnitude of this pressure will change dramatically with local temperature. As regolith grains are warmed, the trapped ice sublimes, but both the local pressure and temperature will determine when the vapor is released. The water vapor migrates through the regolith from the higher vapor pressure regions in the soil, through the system 100, to the collection chamber 60 at ambient low pressure (or near vacuum).

Figure 1B:
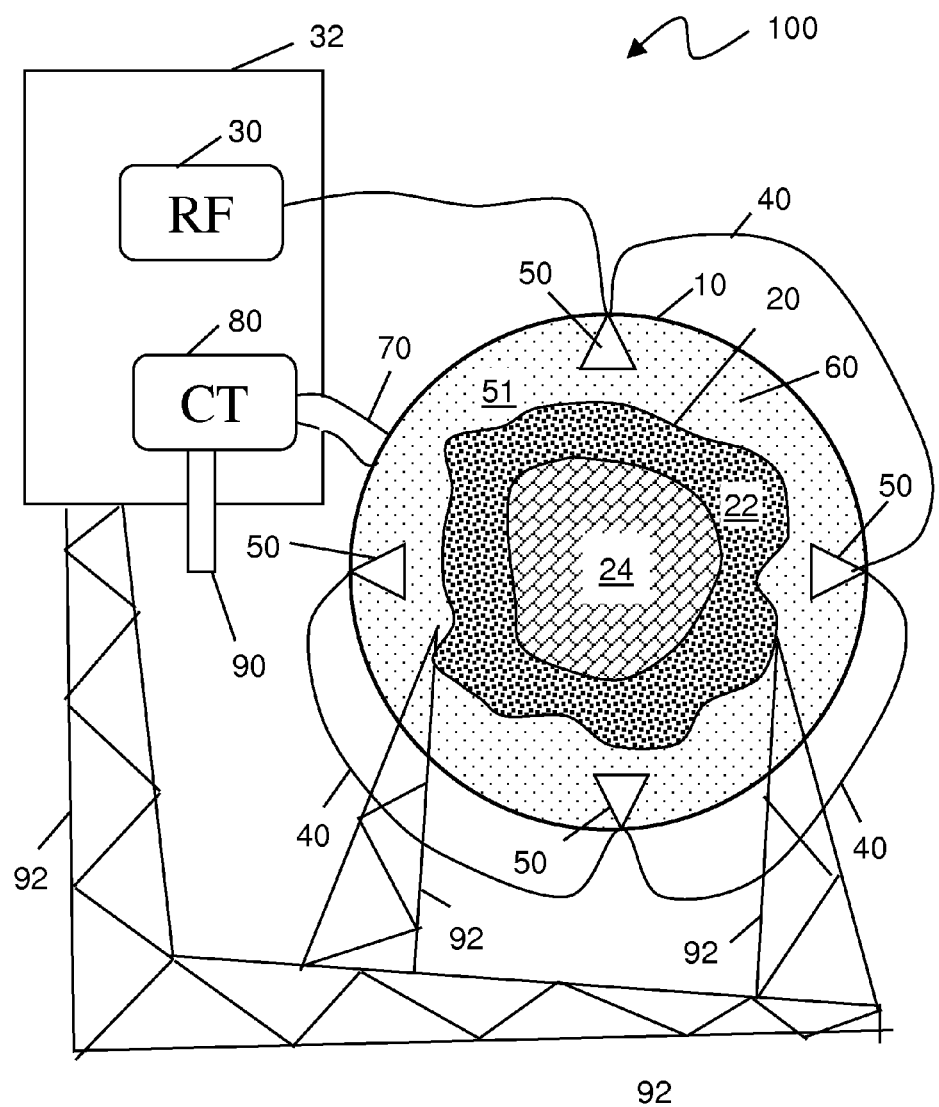
FIG. 1b depicts an exemplary variation of the system of FIG. 1a including a connecting structure for connecting the spacecraft to the collection structure and planetary body.

FIG. 1b depicts an exemplary variation of the system of FIG. 1a including a connecting structure for connecting the spacecraft to the collection structure and planetary body. Referring to FIG. 1b, the spacecraft 32 is connected to a connection structure 92 that connects to the containment structure 10 and planetary body 20. The connection structure may include an articulated arm or other controllable adjustable structure. The connection structure extends through the sphere at sealed connections. The sealed connections may include flexible portions connected to the containment structure 10 to allow adjustment as necessary. The connections may extend into the interior of the sphere to contact the planetary body for stabilization of the body relative to the spacecraft and system. It may be desirable to synchronize motion including rotation to allow extended operation of the antenna for heating a specific location over a period of time. The antenna may then be moved to a new location after the first location is completed.

Figure 1C:
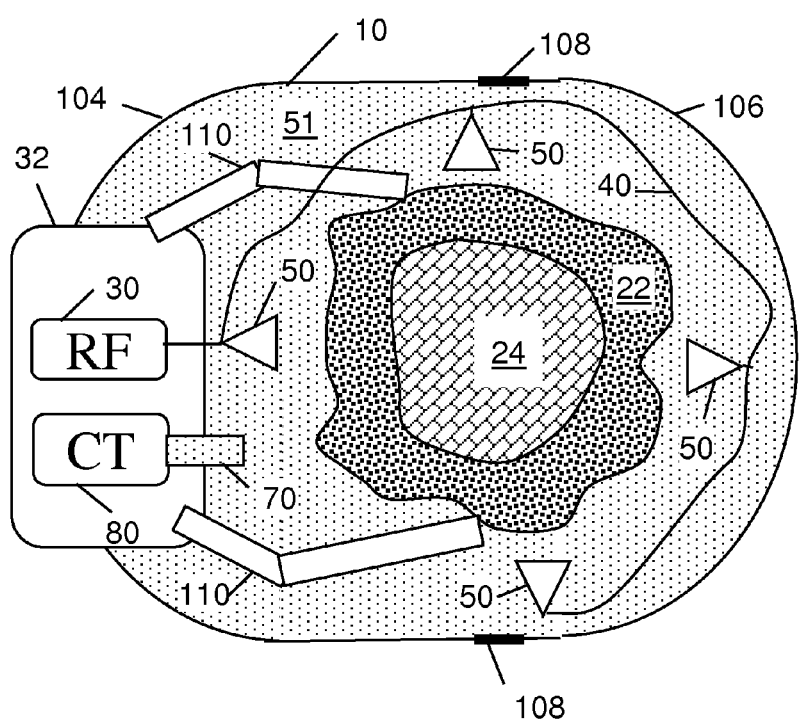
FIG. 1c depicts an exemplary variation including stabilization arms to synchronize rotation and position of the spacecraft and asteroid, further showing a containment structure containing both the spacecraft and asteroid.

FIG. 1c depicts an exemplary variation including stabilization arms 110 to synchronize rotation and position of the spacecraft and asteroid, further showing a containment structure containing both the asteroid stabilization structure and the asteroid. The containment structure could contain the spacecraft also (not shown).

Referring to FIG. 1c, an asteroid is first captured by a spacecraft. The spacecraft maneuvers to best synchronize rotation and spacing with the asteroid. The spacecraft then attaches to the asteroid using the attachment arms to lock in the rotation and spacing. The spacecraft may then minimize rotation so that the spacecraft could maintain communications to Earth and solar cells could be aimed to the sun. During a manned asteroid retrieval mission this would be desired for crew comfort and safety. Once the motion is stable and secure, a containment structure may be deployed from the spacecraft to surround the asteroid and stabilization arms 110. The containment structure shown comprises a first section 104 and a second section 106 joined by an attachment band 108. The attachment band may comprise one or more of a plastic zip sealing structure, thermal sealing, adhesive tape, aluminum adhesive tape, plastic adhesive, metal sealing bands, O-rings or other sealing structures. As shown, the first section and second section may comprise hemispherical and cylindrical components. Other shapes may also be included. Antennas may then be deployed. The RF may then be applied to the asteroid. Volatiles 51 may then make their way to the inlet 70 for the cold trap 80.

Figure 2A:
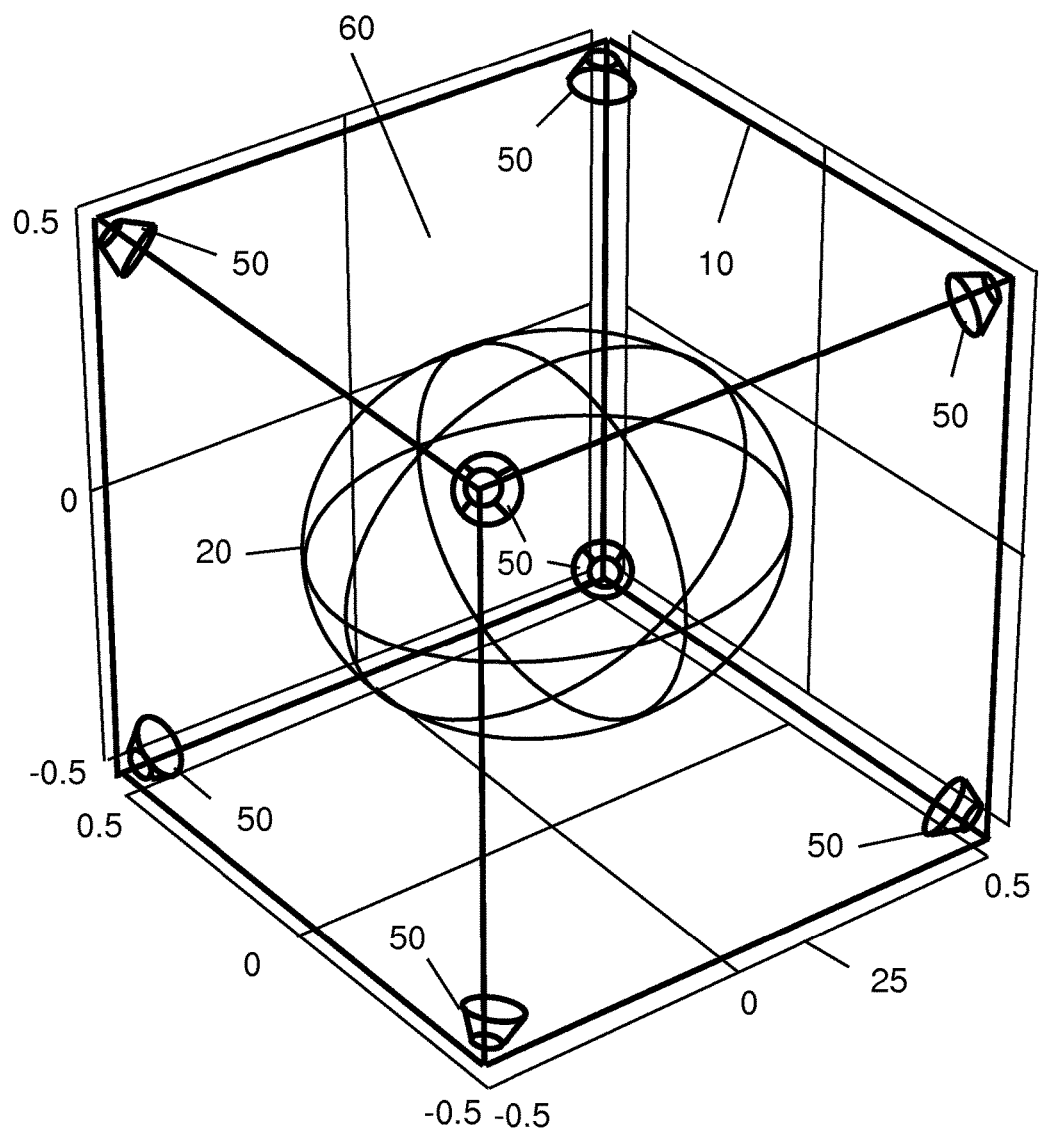
FIG. 2a depicts a wire grid perspective view of an exemplary embodiment of a collection chamber used for extracting and collecting volatiles from the planetary body in space.

FIG. 2a depicts a wire grid perspective view of an exemplary embodiment of a collection chamber 60 including a containment structure 10, used for extracting and collecting volatiles from a volatiles containing body 20, e.g., an asteroid or a large rock from the surface of an asteroid. FIG. 2a shows a cubical collection chamber 60 housing a planetary body 20. Eight directive horn antennas 50 are disposed at each corner and directed to the planetary body. Reference coordinate planes 25 are shown for convenience. Containment structures 10 may take arbitrary shapes. Flat sides as in the cube as shown may be more desirable for smaller structures less than a meter. Larger structures may be more desirable as cylindrical or spherical shapes like as in FIG. 1a because of the significant total forces involved even with near vacuum delta pressures on the order of 1 Torr more or less.

Alternatively, a chamber 10 may be an adaptation of an existing structure such as a cargo bay of a space shuttle or special structure within a space station. In the embodiment shown, the sealed multi-purpose containment structure 10 confines the volatile containing body 20 in the absence of gravity. Further, microwave antennas 50 are arranged in a symmetrical arrangement and are aimed toward the planetary body 20. One or more microwave antennas may be used. Note that in one embodiment, the microwave antennas are horns, as shown; however, other types of microwave antennas may be used in other embodiments.

As energy is absorbed by the planetary body 20, volatiles are liberated, being contained with the multi-purpose containment structure 10. The number of microwave antennas 50 and the arrangement of the microwave antennas 50 can be modified to optimize the power for each horn 50, power duty cycle, and heating efficiency within the asteroid. The horn antennas 50 emit microwaves which may heat the asteroid more uniformly than from only one antenna. Alternatively, the power delivered to each antenna can be phased for optimal extraction efficiency. For example, the phase of each microwave signal from each microwave antenna may be adjusted so that the signals are in phase at a single desired location on the planetary body. As an assist, a probe antenna or a transponder device may be placed on the planetary body to receive the signals and feed back to a phase controller to synchronize the phases.

Figure 2B:
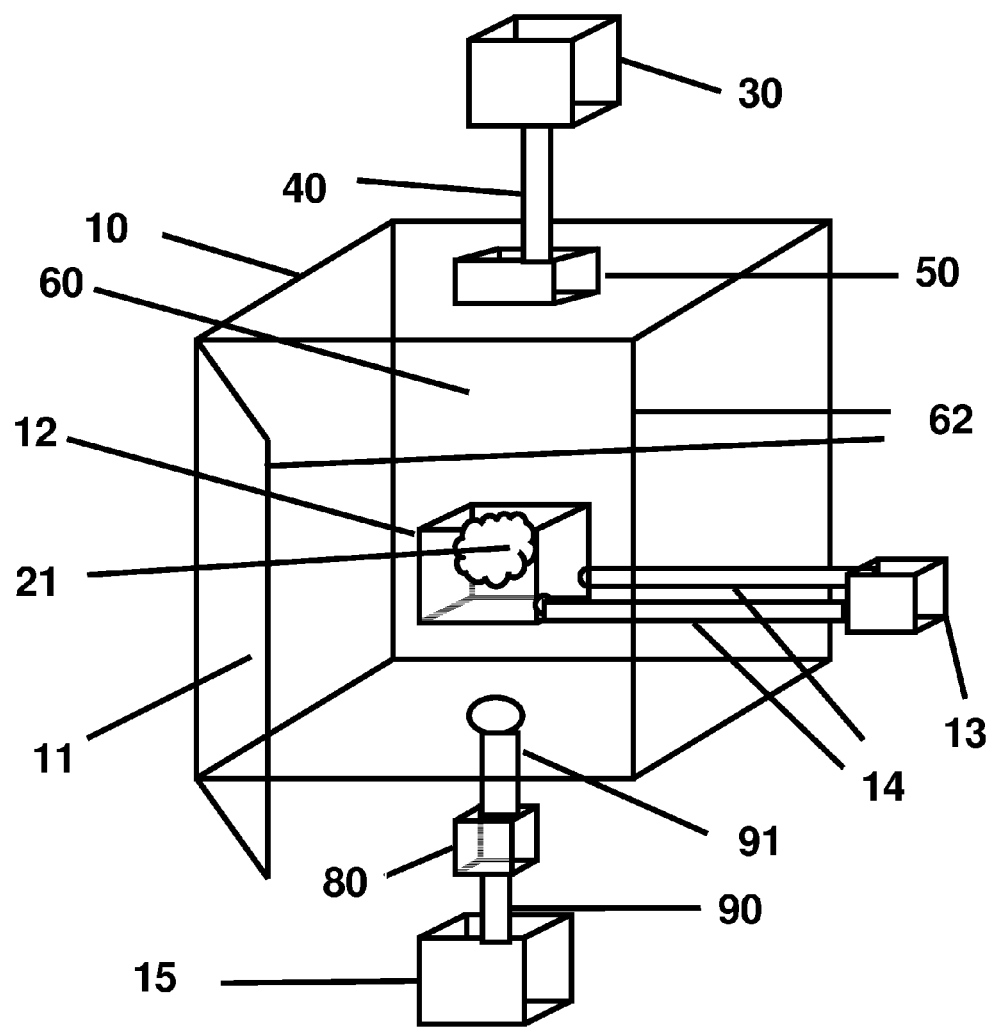
FIG. 2b depicts a perspective view of an exemplary variation of a collation of the system of FIG. 2a for use in a space station including a vacuum pumping capability and supplementary cooling of the volatiles containing body.

FIG. 2b depicts an exemplary variation of the system in FIG. 2a for extracting water or other volatiles from bodies that are completely contained in a collection chamber. The collection chamber could be located in a space station or habitat. This exemplary variation could also be use on Earth for microwave body heating combined with vacuum sublimation freeze drying of bodies. The system provides a means for evacuating the collection chamber 60 and a means for cooling the volatiles containing body 21 to keep the body at the temperature to promote sublimation or evaporation of the volatiles. The container also has a means for opening the container to insert and remove the body, providing a vacuum and RF seal 62. The system could be used for experiments and volatiles extraction from asteroidal or planetary regolith. The system could also be used to extract water from habitat waste products and to recycle water.

In the embodiment shown, the containment structure opening 11 (door) is opened and a volatiles containing body 21 is placed into the volatiles containing body container 12. The containment structure opening 11 is closed and the heat exchanger 13 is turned on and coolant fluid flows through the coolant loop 14 in order to lower the temperature of the volatiles containing body 21 to a temperature near the triple point for water. The vacuum source 15 is then opened to pump down the collection chamber 60 through the vacuum line 90 and the conduit for volatiles 91 to the desired vacuum level. The microwave source 30 provides microwave energy through the microwave delivery component 40 to the microwave antenna 50. A gentle controlled heating provided by the microwave source 30 slowly provides energy that is absorbed in and heats the volatiles containing body 21 causing the water ice to sublime and flow into the collection chamber 60. The small delta pressure difference between the collection chamber 60 and the lower pressure cold trap 80 results in the flow of water vapor to the cold trap 80 where the water vapor condenses back to water ice.

The system could be located in a manned space station or at a human outpost on the moon or Mars. The volatiles containing body could be planetary regolith with water or other volatiles. Experiments could be performed to determine the concentration of volatiles in regolith from different planetary locations. The volatiles containing body could be volatiles containing waste products from the habitation. The water removed from waste produces can be recovered for recycling back into the life support system.

Figure 3A:
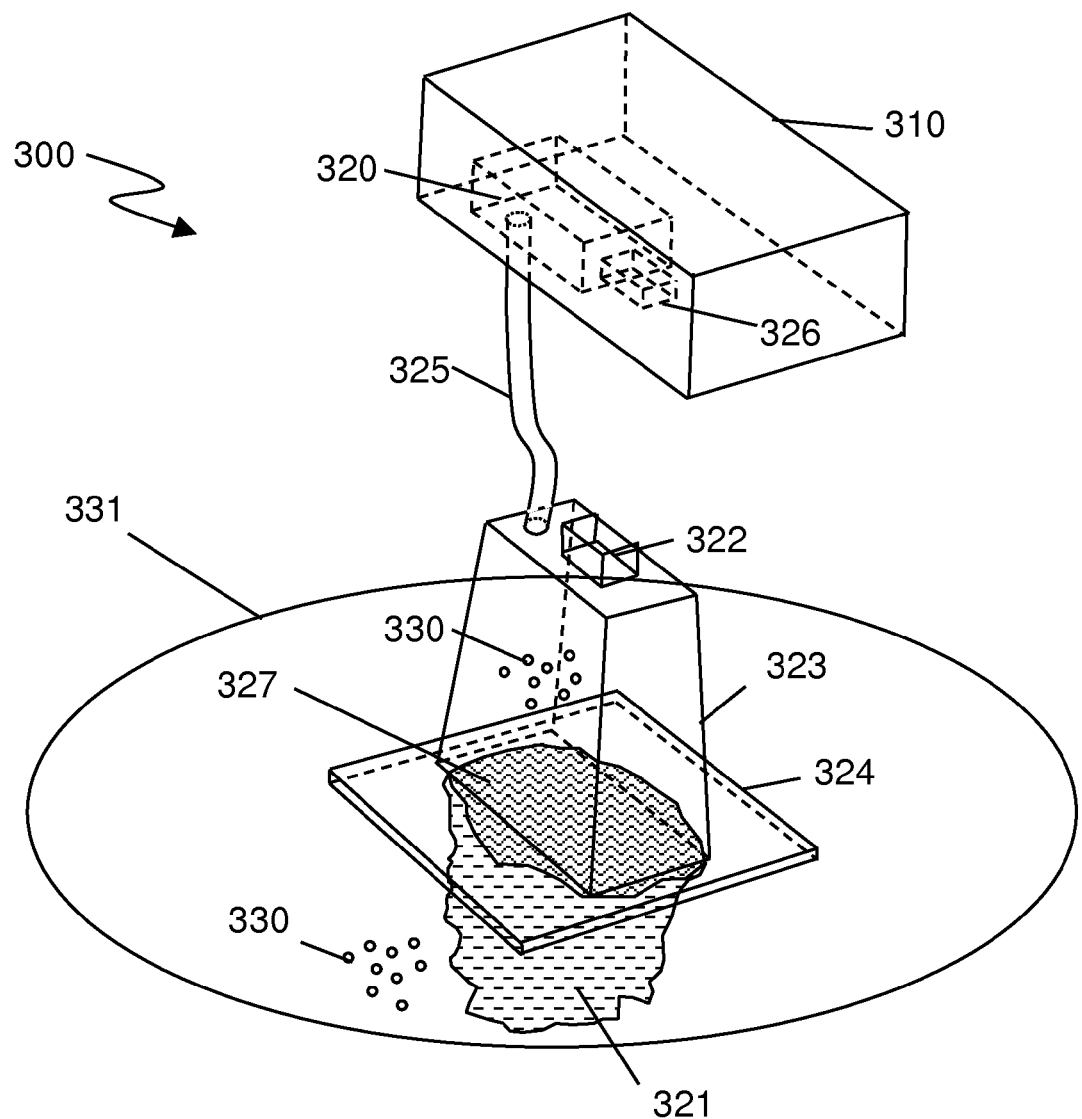
FIG. 3a depicts an exemplary embodiment of a system for extracting water or other volatiles from planetary bodies that are too large to be completely contained in a collection chamber.

FIG. 3a depicts an exemplary embodiment of a system 300 for extracting water or other volatiles from large planetary bodies that are not completely contained in a containment structure. In the embodiment shown, a spacecraft 310 approaches the planetary body 331, and the volatile extraction and collection system 300 makes contact with the planetary body 331 via a sealing apparatus 324. A sealing apparatus 324 is installed against a planetary body 331 to form a seal to prevent the loss of volatiles, and the microwave delivery apparatus 323 is sealed with the sealing apparatus 324 to prevent loss of volatiles.

Note that when the sealing apparatus 324 is installed onto the surface of the planetary body 331, the volatile extraction and collection system 300 can apply pressure against the planetary body 331 to provide a seal between the sealing apparatus 324 and the planetary body. 331. Furthermore, the microwave delivery apparatus 323 interfaces with the sealing apparatus 324. At such interface, a seal formed by pressing the sealing apparatus 324 against the planetary body surface 331 is also used to ensure that gases 330 produced do not escape from the surface of the planetary body 331.

When operated on a planet with substantial gravity like Mars, collection device may be operated on an arm from the spacecraft, and the weight of the spacecraft may be used to press the collection device into the regolith to help form a seal using the sealing device. When operated on a small asteroid or comet with little gravity, the spacecraft may anchor itself to the asteroid by driving or rotating auger anchors to allow the spacecraft to press the dual purpose microwave delivery apparatus and containment structure 323 and sealing rim against the regolith without pushing the spacecraft into space. Slow heating of the regolith will reduce the rate of volatile extraction, reducing the pressure in the sealing apparatus 324 making it easier to maintain the seal against the planetary surface.

A Microwave source 326 on the spacecraft provides microwave energy through a microwave delivery component incorporated into the connecting apparatus 325 through a microwave adapter 322 and to the microwave antenna 323 such that microwave energy is directed at the planetary body 331 from above the surface of the planetary body. The microwave adapter 322 delivers microwave energy to the RF/microwave delivery apparatus 323 such as a trapezoidal horn or conical horn. The microwave delivery apparatus 323 directs the microwave energy toward the surface of the planetary body 331 and into the planetary body 331 containing water ice and/or other volatiles.

The microwave energy is absorbed by and heats the planetary body 331 producing a heated volume 321 within the planetary body, volatilizing the volatile species increasing the ambient pressure in the planetary body 321. In response to the heating, gasses 330 flow toward the surface of the planetary body 331 and in the direction of the sealing apparatus 324. The sealing apparatus 324 forms a hermetic seal with the planetary body 331. The microwave delivery apparatus 323 and sealing apparatus are sealed to prevent the leaking of volatiles. The microwave delivery apparatus 323 provides an opening 327 through the sealing apparatus 324 such that the gasses flow into the microwave delivery apparatus 323.

A connecting apparatus 325 forms a hermetic seal with the microwave delivery apparatus 323 and a volatiles collecting cold trap 320. The cold trap 320 is sufficiently cold such that the volatile gasses condense back to a solid or liquid state within the cold trap 320. Note that the connecting apparatus 325 may comprise mechanical structures (not shown) creating a robotic arm (see FIG. 4, 402). In such an embodiment, the connecting apparatus 325 connected to the spacecraft 310 has dimensional degrees of freedom so that the microwave delivery apparatus 323 can be positioned to the planetary body surface to form a hermetic seal with the sealing apparatus 324. Further, a hollow apparatus within the connecting apparatus 325 forms a hermetic seal preventing the volatiles from escaping to the vacuum of space. Further, the connecting apparatus 325 contains the microwave delivery device to provide microwave energy to the microwave antenna 323.

Figure 3B:
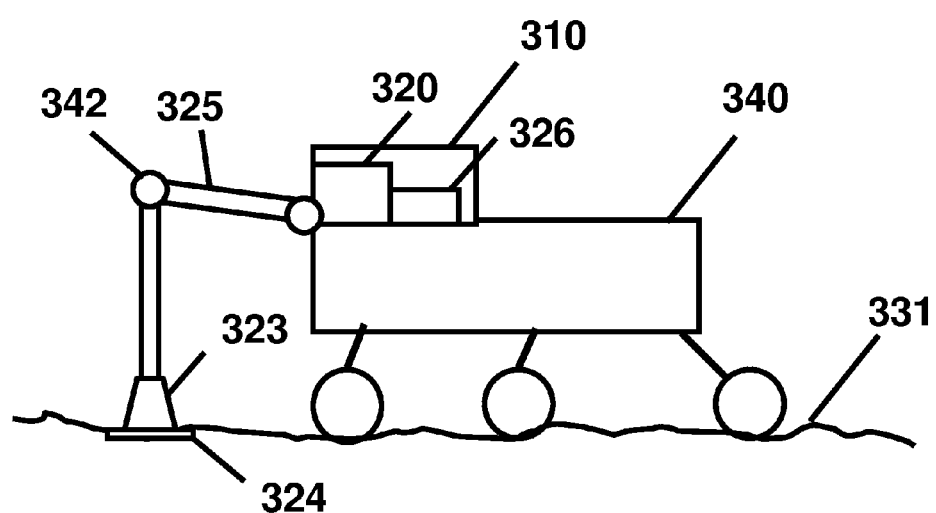

FIG. 3b depicts an exemplary deployment of the collection system of FIG. 3a. FIG. 3b shows the collection system mounted on a roving vehicle 340 with the volatiles collecting head (323 and 324) mounted on an arm 325. The arm 325 is capable of positioning the collecting head at a desired location on the planetary surface 331 and then pressing the head into the regolith, compressing the dust in the area of the sealing flange to reduce the sideways escape of vapor. The microwave energy from the microwave source 326 is delivered with a coax cable (not shown) mounted on the arm 325 delivers microwave energy to the microwave delivery apparatus 323 and applied to the regolith to heat the underlying layers.

The liberated vapor percolates through the regolith into the dual purpose microwave delivery apparatus and containment structure 323 and then into the vapor line in the arm 325 to the condensation unit 320 (cold trap) located in the rover 340. The vapor line may be run through or parallel to the arm 325. In one variation, the arm may be tubular with vapor pass through joints 342 so that the arm forms the vapor connecting apparatus 325.

Alternatively, the condensation unit 320 may be located in the horn antenna 323 volume. The condensation unit 320 may then periodically be closed off and cycled to deliver either liquid or high pressure vapor to the rover collection system.

Figure 4A:
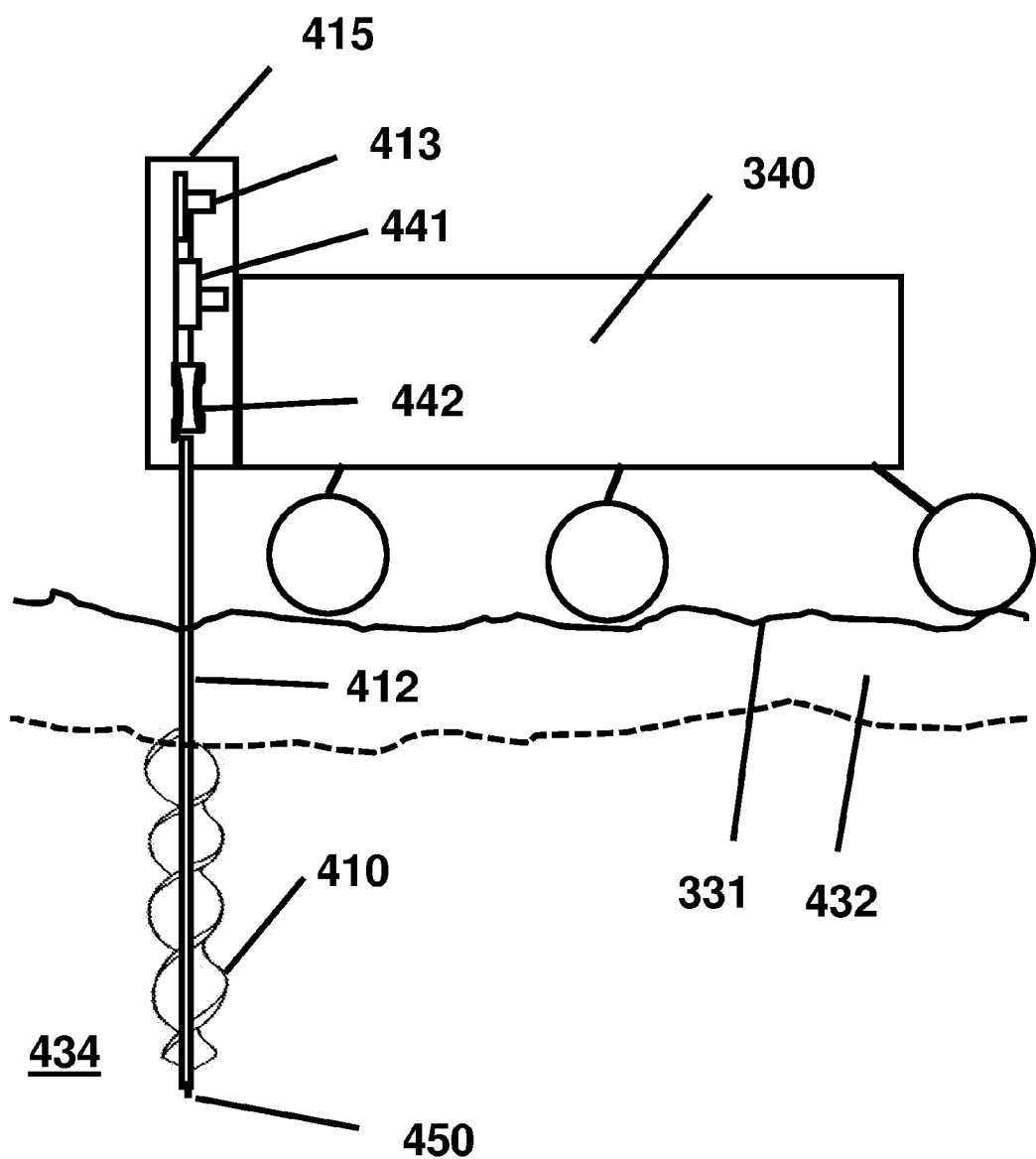
FIG. 4a depicts an exemplary deployment of a hollow auger volatiles collection system mounted on a roving vehicle.

FIG. 4a depicts an exemplary deployment of a hollow auger volatiles collection system mounted on a roving vehicle 340. This exemplary embodiment can be used for the collection of volatiles from layers at depths below a planetary surface 331 and also below a volatiles depleted layer 432 below the surface 331. An auger anchor is used to bore into the regolith 434 using a rotational drive assembly 415. The auger blades 410 bore and dig into the regolith 434 as a rotational force is provided to the hollow auger shank 412 with a rotating drive 442.

FIG. 4b shows detail of the auger of FIG. 4a. The auger has a hollow auger shank 412 through which a microwave/RF coax cable 440 delivers microwave power from a microwave source (not shown) to an electrical slip ring 441 (FIG. 4a) and on to the microwave/RF coax cable 440 (FIG. 4b). The microwave/RF coax cable passes down inside the hollow auger shank 412. The microwave energy is transmitted to the regolith at the bottom of the auger with the microwave/RF launcher 450.

The microwave heating of the regolith liberates volatiles (water) by sublimation. The water vapor builds up a local pressure within the pores in the regolith. The water vapor then flows toward the lower pressure region at the tip of hollow auger shank 412. The vapor flows through a gas permeable plug 452 that serves a dual purpose of passing the volatile gas and preventing regolith from getting into the hollow auger shank 412. The water vapor passes up through the hollow auger shank 412 to a rotating gas fitting 413 (FIG. 4a) and on to the cold trap (not shown).

FIG. 4c shows an exemplary variation of the microwave launcher 450. The microwave port can be a circumferential slot 456 or a longitudinal slot 454 in the auger shank to emit the microwave energy into the regolith. The microwave port can serve the dual purpose being a microwave port to transmit microwave energy into the regolith and to pass volatiles into the hollow auger shank 412 through a vapor permeable plug 452 built into the slot. The permeable plug may be any porous material, including but not limited to porous metal, sintered metal, ceramic, or polymeric. The slot antennas 454 and 456 may have an advantage in being laterally directional, thus being able to concentrate available power in a specific lateral direction for better radial penetration. After operation in a given direction, the direction may be rotated to extract from a new direction to progressively cover the full circle.

Figure 5:
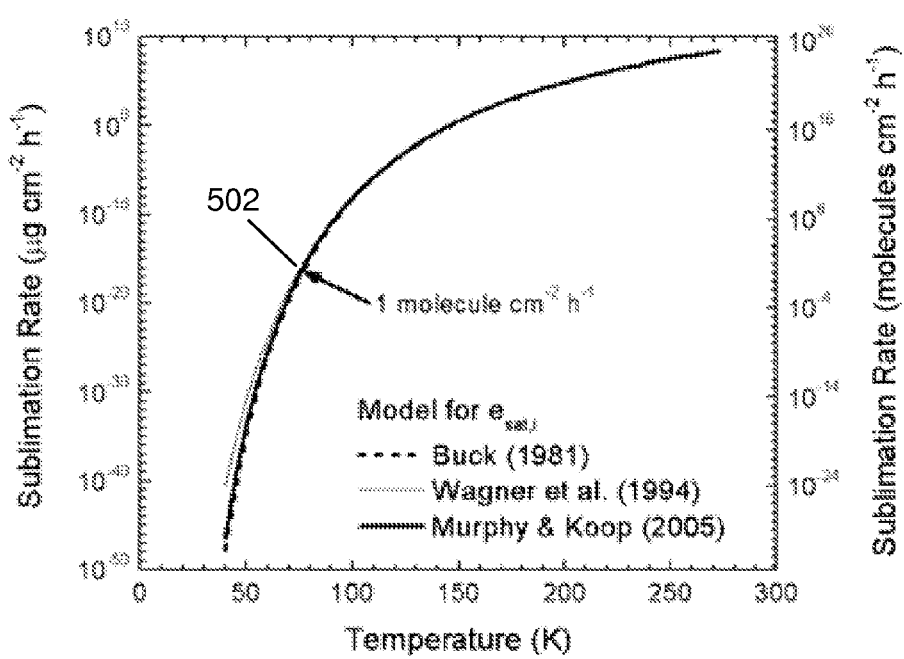
FIG. 5 shows a plot of sublimation rate in vacuum for water ice.

FIG. 5 shows a plot of sublimation rate in vacuum for water ice. Scales for molecules per square centimeter per hour and for micrograms per square centimeter per hour are shown. Sublimation is the phase change from solid to vapor directly without melting to liquid. Sublimation occurs at temperatures below the substance triple point where all three phases (solid, liquid and gas) are stable. The water sublimation rate (mass of water ice converted to water vapor per surface area and per time) is a very strong function of temperature. Various sublimation models are shown. Note that the models appear to compare very closely. The sublimation rate is the greatest near the water critical temperature near 0° C.

The point at reference 502 represents one molecule per square centimeter per hour. On may appreciate that water ice may be "locked" into the lunar or Martian permafrost at this temperature for geological time scales.

Figure 6:
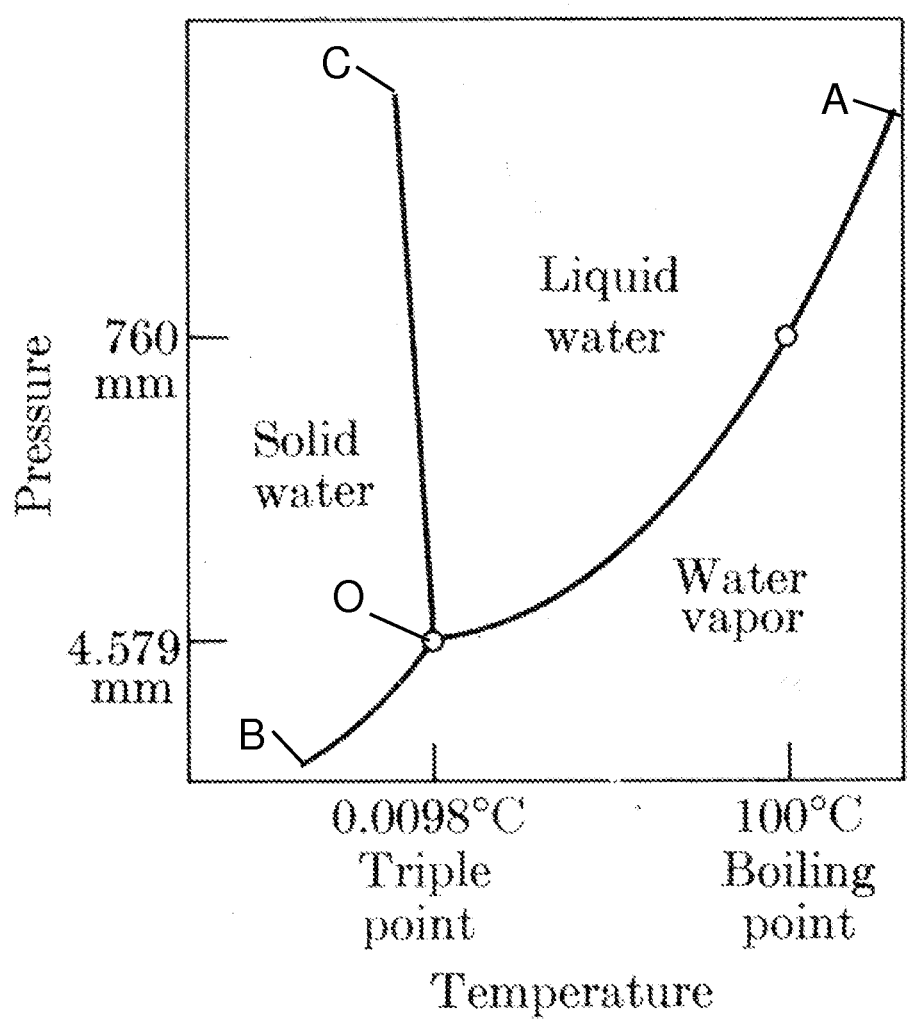
FIG. 6 is a temperature-pressure phase diagram of water.

FIG. 6 is a temperature-pressure phase diagram of water ($H_2O$) showing the triple point (O), the water ice and water vapor phase boundary (B-O), the liquid water and water vapor phase boundary (O-A), and the water ice and liquid water phase boundary (O-C). Referring to FIG. 6, the vacuum sublimation (transition of water ice directly to water vapor) occurs in the vacuum of space and on planets such as Mars at pressures less than the triple point (O). Heating of ice initially at temperatures and pressures less than the triple point (O) causes the ice temperature to increase and as it gets to the phase boundary temperature, the water ice transforms to water vapor by the sublimation phase change. If the initial pressure is greater than the triple point and the temperature is less than the triple point, heating will cause water ice to transform to liquid water at the phase boundary O-C and with further heating the liquid water will transform to water vapor at the phase boundary O-A by boiling (or evaporation). But, the heat of boiling is an order of magnitude greater than the specific heat of water which reduces the liquid water temperature and can eventually freeze the liquid water to ice. In general, the process in space will be sublimation of water ice to water vapor.

Table 1 shows the triple point of volatiles that might be present in lunar and Mars permafrost as well as asteroids and comets. The triple points (the temperature and pressure) where potential space volatiles are stable as solid, liquid, and vapor.

Table 2 shows the decomposition temperatures of some volatiles containing compounds that might be present in planetary bodies. The decomposition temperature is the temperature to decompose and release the volatile gas.

TABLE 1

| Volatile | Triple Point | |
|---|---|---|
| Water ice | 0.01 C. | 0.006 Atm |
| Dry Ice ($CO_2$) | −57 C. | 5.2 Atm |
| Mercury | −39 C. | 1.6e−9 Atm |
| $SO_2$ | −75 C. | 0.017 Atm |
| Ammonia | −78 C. | 0.06 Atm |
| Ar | −189 C. | 0.68 Atm |
| Ethanol | −123 C. | 4.2E−9 Atm |
| $NO_2$ | −164 C. | 0.22 Atm |
| Methane | −182 C. | 0.115 Atm |
| CO | −205 C. | 0.15 Atm |
| $N_2$ | −210 C. | 0.12 Atm |
| $O_2$ | −219 C. | 0.0015 Atm |

TABLE 2

| Volatile Containing Compound | Decomposition Temperature | |
|---|---|---|
| AgO | 280 C. | Decomposition |
| HgO | 500 C. | Decomposition |
| Clays | 400 to 600 C. | Dehydration |
| Magnesium Carbonate | 165 to 350 C. | Decomposition |
| Kaolinite | 100 to 500 C. | Dehydration |
| Calcium Carbonate | 840 C. | Decomposition |
| Hydroxyl containing surfaces | 500 to 1000 C. | Dehydroxylization |

Figure 7:
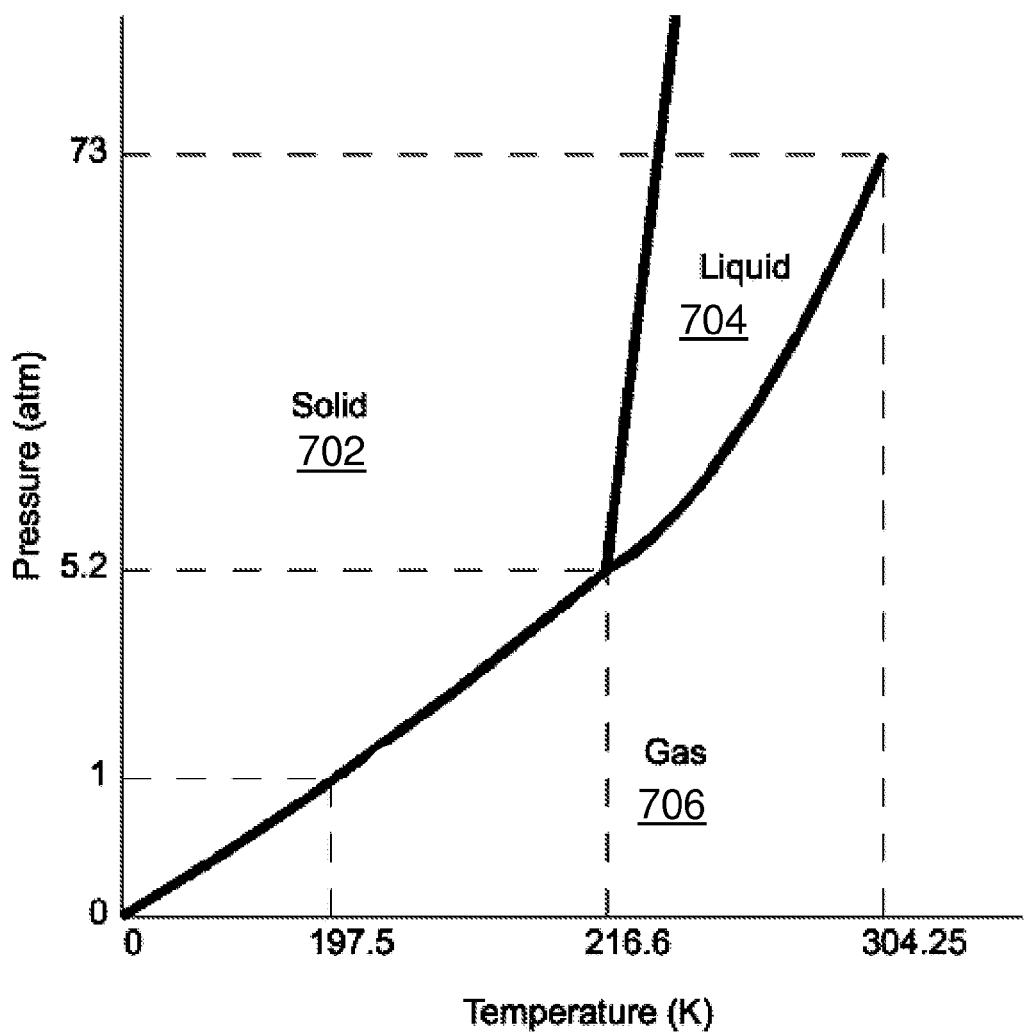
FIG. 7 shows a phase diagram for carbon dioxide, CO2.

FIG. 7 shows a phase diagram for carbon dioxide, $CO_2$. $CO_2$ is another exemplary useful volatile found on many planetary bodies. Temperatures are in degrees Kelvin. Pressures are in standard atmospheres. 1 atm=0.987 Bar. Region 702 is the solid phase. Region 704 is the liquid phase. Region 706 is the gas phase.

Moon in a Bottle Experiment

The "Moon in a Bottle" experiment demonstrated that 2.45 GHz microwaves will heat simulated planetary permafrost with the subsequent sublimation of water ice to water vapor. The Moon in a bottle (and Mars in a bottle) experiments involved placing lunar or Mars simulated regolith permafrost with 2% to 10% water (weight %) in a glass flask (transparent to microwaves) with a tubing connection. A vacuum line was connected to the tube. The flask with frozen permafrost was placed into a microwave oven and microwave energy applied to the simulated permafrost.

The experiment shows that the microwave energy can couple to regolith permafrost simulant at cryogenic temperatures. As microwave energy is absorbed by the permafrost the permafrost warms. The water ice begins to sublime to water vapor that flows from the glass flask to a cold trap between the glass flask and the vacuum pump. The water vapor rapidly and efficiently condenses back to water ice as it is deposited in the liquid nitrogen cooled cold trap. Experiments at lunar conditions (<$10^{-7}$ Torr vacuum, liquid $N_2$ temperature) used a cold trap at $LN_2$ temperatures (−196° C.) while experiments at Mars conditions (4 to 6 Torr vacuum, −68° C. temperature) used a dry ice in ethanol cold trap (−78° C.). In both cases virtually all of the water ice sublimed and was efficiently captured in the cold trap (approximately 99% efficient, based on weight measurements).

Water Extraction Test Using Simulated Mars Permafrost Conditions

An experiment was performed relating to extraction of water from Mars permafrost simulant. A cylindrical vacuum container with a Lexan® polycarbonate cover containing a large quantity, 1 kg, of JSC 1A Mars simulant (from Orbital Technologies Corporation) with 10% water (by weight) was frozen to below the water triple point temperature. The vacuum chamber was pumped to a vacuum similar to the Mars atmosphere (5 to 6 Torr). Microwaves from a 2.45 GHz magnetron were directed through a waveguide to a microwave horn directed into the Mars simulant permafrost. A heating regime was employed with the lowest magnetron power level of 30% (less than 150 watts of microwave energy) with a duty cycle of 30 seconds power on, for cycles of 3 to 5 minutes. During the 30 seconds of heating, the vacuum under the microwave horn increased to about 7 Torr due to the liberation of water vapor. During the cycle with the power off, the vacuum slowly returned to about 5 Torr as the water vapor flowed from near the permafrost surface to the cold trap at approximately 5 Torr vacuum. After 3 hours, 75 grams of water was extracted and captured in a cold trap cooled by a dry ice ($CO_2$) and liquid isopropyl alcohol bath (−77° C.). This experiment demonstrated that microwaves can be beamed into the regolith simulant to heat permafrost thereby subliming water ice that can be subsequently captured with a cold trap in line with the lower vacuum source representing the ambient vacuum level of the Mars atmosphere.

After water ice fills the cold trap, the cold trap serves as a storage container for the extracted water. The cold trap has a valve to seal the inlet and the outlet to the cold trap. Then the cold trap is replaced with an empty cold trap vessel. Vacuum quick disconnect clamps fasten and seal the cold traps into the apparatus for automated operation. The water is removed from the cold trap by connecting the cold trap to the collection/storage vessel. Transferring the water to a collection or storage vessel is accomplished by heating elements in the cold trap that warm the water ice to sublime the water ice to water vapor. The water vapor increases the pressure in the cold trap vessel and the water vapor will flow to the to the collection/storage vessel by vapor transport where the water vapor is condensed in a collection/storage vessel cold trap.

Water Extraction Test Using Simulated Asteroid Conditions

An experiment was performed relating to extraction of water from a water containing asteroid such as a carbonaceous chondrite. There are presently no standardized asteroid simulant materials. A simulant was fabricated from common items with similar chemical constituents to serve as the asteroid simulant material to be heated by the microwave energy. A 100 g batch for the simulated asteroid was prepared. The composition used by weight percent consisted of 25% JSC 1A lunar regolith simulant, 20% JSC 1A Mars regolith simulant, 20% dried clay slip, 10% charcoal, 5% calcium sulfate, 5% joint compound (limestone, clay, mica, starch), and 5% Portland mortar. The clay slip, joint compound, and mortar were included to bind the constituents together into a body. The constituents were dried at 100° C. for 3 hours and then thoroughly mixed. The dry constituents were placed into a plastic bag and 10% (10 ml) of water was added to complete the 100 g batch. The mixture was kneaded in the plastic bag to disperse the water. The body was crumbly, so an additional 5 ml of water was added. Through kneading produced a body that held together. The bagged simulated asteroid was placed into a freezer to further solidify the body by freezing the water. Two hours prior to the experiment, the bagged simulated asteroid was placed into a dry ice and isopropyl bath at −78° C.

A vacuum box was used to simulate the vacuum of space. A vacuum pump maintained a vacuum. The box contained a large port with a PLEXIGLASS® (poly(methyl methacrylate)) window that is transparent to microwaves. A 2.45 GHz microwave system provided the microwave energy. A magnetron was connected to a waveguide to a magnetron adapter, that was likewise connected to a microwave waveguide and to a microwave horn. The microwave horn was pressed against the PLEXIGLASS® window to transmit the microwaves into an asteroid containment bag inside the vacuum chamber. An aluminized 3 mil Mylar® polyester bag served as the asteroid containment device. The bag was attached to the wall of the vacuum chamber enclosing the window A tube fitting was attached to the bag and connected to a fitting that passed through the vacuum chamber wall. Outside of the vacuum box, the tubular line was connected through a cold trap (cooled to −78° C. with a dry ice and isopropanol bath) and further connected to a vacuum pump. The simulated asteroid was placed into a PYREX® glass beaker and into the polyester bag and sealed. The vacuum box was pumped to simulate space vacuum. The sealed bag will also be pumped to a vacuum through a separate vacuum line through a cold trap to a vacuum pump simulating the space vacuum below the triple point of water. Microwave energy was beamed into the bag to heat the simulated asteroid material to sublimate the water. The microwave energy heated the simulated asteroid and the energy was contained in the electrically conducting microwave containment bag. The bag was sealed to also contain the sublimed water vapor. As the water vapor pressure in the bag increases, the water vapor flowed through a conduit to the external cold trap and condensed to capture the extracted water.

The microwave energy was supplied with a control circuit providing 30% maximum microwave power of approximately 300 watts. A heating duty cycle of 20 seconds each minute was utilized that provided an average heating power of approximately 100 watts. The body was heated for 1 hour. After about 5 minutes, water ice was observed condensing onto the cold trap. The water condensation collection appeared to be complete after about 30 minutes. The heating was continued for a total of 1 hour. After 1 hour the vacuum pumps and microwave source were turned off and the vacuum box was opened. The PYREX® beaker holding the asteroid was very hot to the touch. The simulated asteroid appeared to be hotter than 100° C. The mass of the dried asteroid was 87 g, the volume of water collected was 18 ml. Therefore all of the water (15 ml) that was added to the dried constituents was extracted from the simulated asteroid and captured in the external cold trap. There was an additional 3 g of water that was removed from the body that was likely chemically bound water that was recovered by decomposition of the hydrated compounds.

This experiment demonstrates in-situ water extraction from a small asteroid or cometary body. This demonstrates that an entire planetary body would not have to be transported to a near Earth orbit or to a volatiles processing facility in space. The water can be extracted in-situ and only the extracted water needs transportation—not the whole asteroid. This capability for space extraction of water may greatly reduce the required rocket propellant and total spacecraft mass for an asteroid mining mission. A portion of the extracted water can also be used for the mission return propellant, also reducing the mission payload mass and total costs.

What is claimed is:

1. A system for extracting and collecting a volatile substance from a volatiles containing in-space body, said in-space body being a planet, an asteroid, a comet, a moon or other natural extra-terrestrial object; said in-space body having a surface; said system comprising:

an electromagnetic energy source for producing electromagnetic energy;

an antenna coupled to said electromagnetic energy source for receiving said electromagnetic energy;

said antenna configured for disposition above a contiguous portion of said surface of said in-space body and external to said in-space body, said antenna being a directional antenna configured for directing said electromagnetic energy toward said in-space body for heating at least a portion of said in-space body to convert said volatile substance to vapor;

a containment member; said containment member disposed to cover said contiguous portion of said surface of said in-space body; said containment member in contact with said surface around a periphery of said contiguous portion of said surface of said in-space body;

said containment member forming a seal sufficient to maintain a positive pressure of said vapor within said containment member; said containment member configured to direct said vapor for collection; and a condensation unit coupled to said containment member and configured for receiving said vapor from said containment member;

said condensation unit configured for condensing said vapor for concentration and storage of said volatile substance;

the system further including a sealing device comprising a planar flange on said containment member surrounding a radiating exit aperture in said containment member, said radiating exit aperture for passing said electromagnetic energy, said planar flange for contacting said surface to form a seal between said containment member and said contiguous portion of said surface of said in-space body.

2. The system as recited in claim 1, wherein said sealing device comprises a flexible member capable of sealing by conformally contacting said planar flange on said containment member and conformally contacting said contiguous portion of said surface of said in-space body.

3. The system as recited in claim 2, wherein said antenna comprises a horn antenna having a feed region at a first end and said radiating exit aperture at a second end, said horn antenna also forming said containment member, said sealing device forming a flange around said radiating exit aperture at said second end; said flange for contacting said surface of said in-space body to form said seal for maintaining said positive pressure.

4. A system for extracting and collecting a volatile substance from a volatiles containing in-space body, said in-space body being a planet, an asteroid, a comet, a moon or other natural extra-terrestrial object; said in-space body having a surface; said system comprising:
- an electromagnetic energy source for producing electromagnetic energy;
- an antenna coupled to said electromagnetic energy source for receiving said electromagnetic energy;
- said antenna configured for disposition above a contiguous portion of said surface of said in-space body and external to said in-space body,
- said antenna being a directional antenna configured for directing said electromagnetic energy toward said in-space body for heating at least a portion of said in-space body to convert said volatile substance to vapor;
- a containment member; said containment member disposed to cover said contiguous portion of said surface of said in-space body; said containment member in contact with said surface around a periphery of said contiguous portion of said surface of said in-space body;
- said containment member forming a seal sufficient to maintain a positive pressure of said vapor within said containment member; said containment member configured to direct said vapor for collection; and
- a condensation unit coupled to said containment member and configured for receiving said vapor from said containment member;
- said condensation unit configured for condensing said vapor for concentration and storage of said volatile substance;

further including a robotic arm configured for positioning said antenna and pressing said flange onto said surface of said in-space body to form said seal.

5. A system for extracting and collecting a volatile substance from a volatiles containing in-space body, said in-space body being a planetoid, an asteroid, a comet, a moon or other natural extra-terrestrial object; said in-space body having a surface; said system comprising:
- an electromagnetic energy source for producing electromagnetic energy;
- an antenna coupled to said electromagnetic energy source for receiving said electromagnetic energy;
- said antenna configured for disposition external to said in-space body;
- said antenna being a directional antenna configured for directing said electromagnetic energy toward and into said in-space body for heating at least a portion of said in-space body to convert said volatile substance to vapor;
- a containment member;
- said containment member disposed external to said in-space body for containing said vapor released by said in-space body through said surface of said in-space body;
- said containment member configured to enclose the entirety of said volatiles containing in-space body;
- said containment member forming a seal sufficient to maintain a positive pressure of said vapor within said containment member;
- said containment member comprising a reclosable sealing mechanism; and
- a condensation unit coupled to said containment member and configured for receiving said vapor from said containment member;
- said condensation unit configured for condensing said vapor for concentration and storage of said volatile substance.

6. The system as recited in claim 5, wherein said containment member surrounds said body without contacting said body thereby allowing said body to float free of said containment member;
- wherein said containment member being reflective to said electromagnetic energy to redirect scattered energy back toward said in-space body for heating.

7. The system as recited in claim 5, wherein said system includes a holding system for attaching and holding a relative position of said in-space body and said system.

8. The system as recited in claim 5, wherein said containment member comprises plastic material.

9. The system as recited in claim 8, wherein the plastic material comprises polyester.

10. The system as recited in claim 8, wherein the plastic material is treated for reflecting said electromagnetic energy back to said in-space body and for containing said electromagnetic energy within said containment member.

11. The system as recited in claim 5, wherein said containment member comprises a spheroidal portion.

12. The system as recited in claim 5, wherein said containment member is configured to contain particulate material from the in-space body.

13. The system as recited in claim 5, wherein said containment member is a rigid walled member capable of maintaining a vacuum.

14. The system as recited in claim 5, wherein said containment member is configured to contain vapor from sublimation of said volatile substance.

15. The system as recited in claim 5, wherein said containment member is further configured to contain a volatiles containing in-space body near a decomposition temperature of a substance within said in-space body, said substance at said decomposition temperature yielding said volatile substance.

16. The system as recited in claim 5, wherein said positive pressure is below 1000 Pascals.

17. The system as recited in claim 5, wherein said electromagnetic energy is between 1 MHz and 100 GHz.

18. The system as recited in claim 5, wherein said electromagnetic energy source is also configurable for data communication.

19. A system for extracting and collecting a volatile substance from a volatile containing in-space body, said in-space body being a planet, an asteroid, a comet, a moon or other natural extra-terrestrial object; said in-space body having a surface; said system comprising:
- an electromagnetic energy source for producing electromagnetic energy;
- an antenna coupled to said electromagnetic energy source through an electromagnetic energy delivery component, said antenna for receiving said electromagnetic energy and delivering said electromagnetic energy to said volatile containing in-space body;
- an auger drive apparatus coupled to an auger;
- said auger comprising a hollow shank and a spiral blade around said hollow shank; said antenna receiving said electromagnetic energy through said hollow shank of said auger;
- said auger configured to penetrate regolith of said in-space body and deliver the electromagnetic delivery component into the regolith without first drilling a hole and then inserting the electromagnetic delivery component into the regolith;
- said auger configured to deliver said electromagnetic energy into the regolith to provide subsurface heating;

said auger hollow shank forming a volatiles containment member configured to receive said volatile substance from said volatile containing in-space body and communicate said volatile substance through said hollow shaft of said auger;

said auger hollow shank having a gas permeable plug capable of permitting flow of external vapor into said auger hollow shank while blocking entry of regolith; and a condensation apparatus coupled to said auger to receive said volatile substance from said auger, said condensation apparatus for condensing said volatile substance for concentration and storage of said volatile substance.

20. The system as recited in claim 19, wherein said volatile containing in-space body is at a temperature and pressure less than a triple point of said volatile substance.

21. The system recited in claim 19, wherein said auger provides an anchoring force to stabilize the system on said in-space body.

22. The system as recited in claim 19, wherein the auger comprises a slot antenna in said shank of said auger.

23. The system as recited in claim 22, wherein said slot antenna is circumferentially oriented in said shank.

24. The system as recited in claim 22, wherein said slot antenna is longitudinally oriented in said shank.

25. The system as recited in claim 22, wherein a slot of said slot antenna is closed with said gas permeable plug.

26. The system as recited in claim 25, wherein said gas permeable plug comprises polymeric material.

27. The system as recited in claim 25, wherein said gas permeable plug comprises ceramic material.

28. The system as recited in claim 5, wherein said system is configured to utilize said volatile substance as propellant for propulsion.

29. The system as recited in claim 28, wherein said electromagnetic energy source is configurable to ionize said volatile substance to produce said propulsion.

* * * * *